Figure 5:
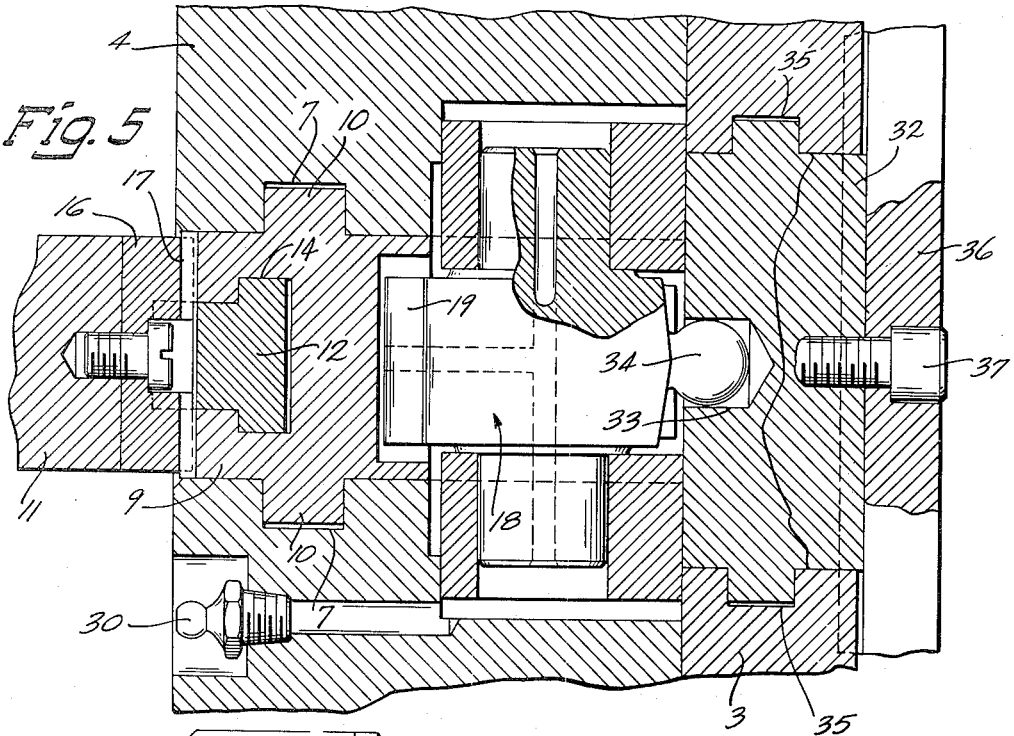

Jan. 3, 1956 L. A. LEIFER 2,729,459
BALANCED ROTARY CHUCK
Filed Nov. 3, 1950 4 Sheets-Sheet 1
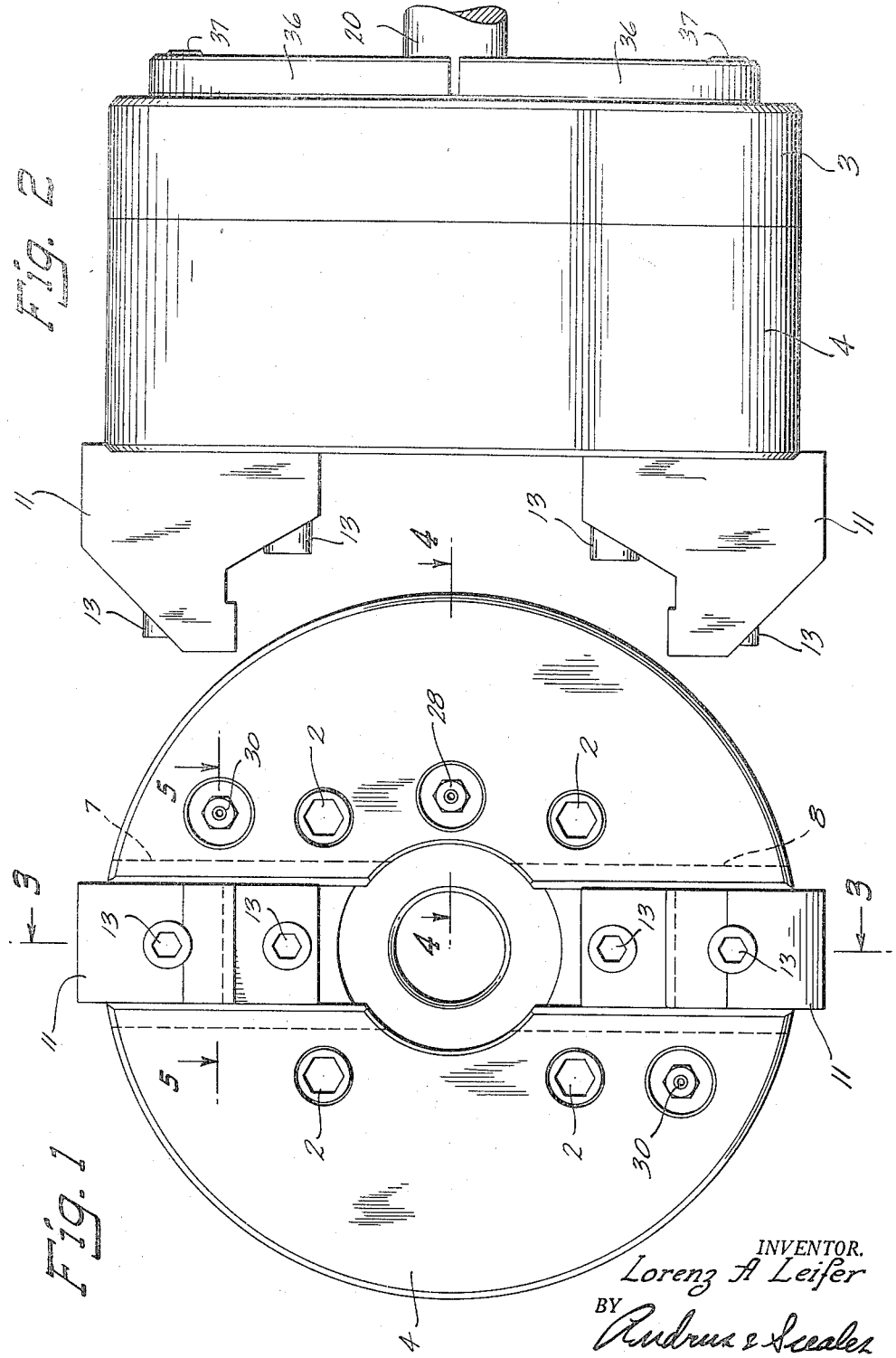
INVENTOR.
Lorenz A. Leifer
BY Andrus & Scealer
Attorneys

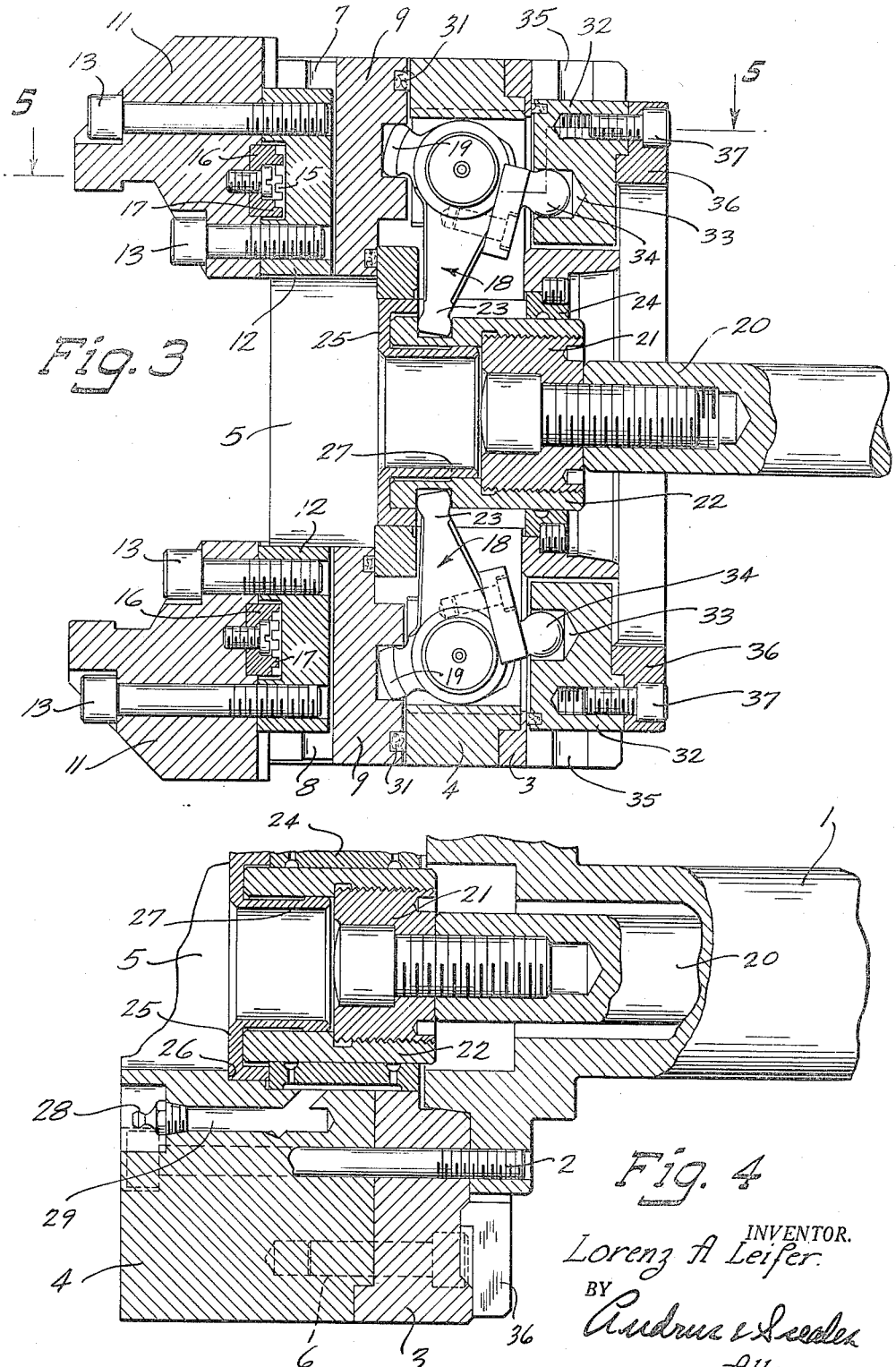

Jan. 3, 1956

L. A. LEIFER 2,729,459

BALANCED ROTARY CHUCK

Filed Nov. 3, 1950

4 Sheets-Sheet 3

INVENTOR.
Lorenz A. Leifer
BY
Andrus & Scales
Attorneys

Jan. 3, 1956
L. A. LEIFER
2,729,459
BALANCED ROTARY CHUCK
Filed Nov. 3, 1950
4 Sheets-Sheet 4
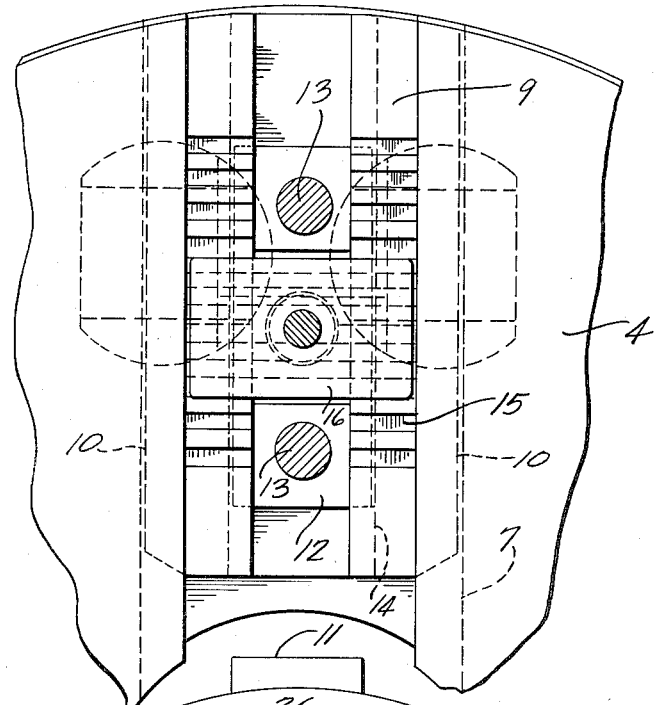
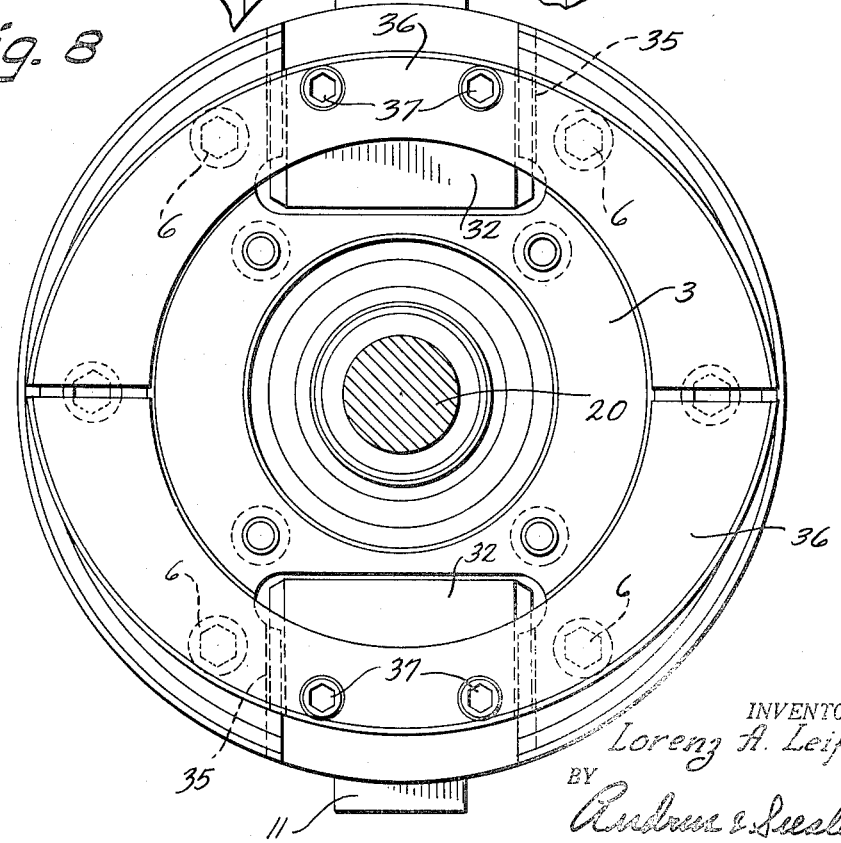
INVENTOR.
Lorenz A. Leifer.
BY
Andrus & Seeler
Attorneys

United States Patent Office 2,729,459
Patented Jan. 3, 1956

2,729,459
BALANCED ROTARY CHUCK

Lorenz Albert Leifer, Madison, Wis., assignor to Gisholt Machine Company, Madison, Wis., a corporation of Wisconsin Application November 3, 1950, Serial No. 193,766

12 Claims. (Cl. 279—119)

This invention relates to a balanced rotary chuck, and more particularly to a balanced rotary chuck having radially operative jaws.

A principal object of the invention is to provide means in a rotary chuck for balancing or counteracting the centrifugal forces which tend to radially spread or open the jaws when they are gripping a rotating workpiece.

This outward centrifugal force is not constant and increases substantially with increased rotational speed of the workpiece. Therefore, a closing force sufficient to hold the work when stationary or rotating at low speeds may subsequently prove inadequate. As a result, workpieces are normally held by closing pressure well in excess of that necessary to grip the same when stationary, with the realization that this initially excessive force will be necessary for gripping when high rotational operating speed is attained.

With delicate work, such as thin walled hollow members, initial excessive closing pressure is undesirable. This invention is intended to nullify grip loosening centrifugal forces, and thereby make unnecessary the use of gripping pressure substantially greater than necessary to hold the work while stationary. By permitting the use of minimum gripping force at all times, the possibility of scarring or deforming of the work by the chuck jaws will be greatly lessened.

A further object is to provide a rotary chuck capable of utilizing lighter and less expensive jaw closing mechanism due to the reduction of required gripping force at high rotational speeds.

A further object of the invention is to provide a balanced chuck in which the centrifugal opening force on the jaws are counteracted regardless of the amount of initial closing force desired to grip the workpiece when stationary. Thereby, the jaws of the chuck can be prebalanced, and such balance will be maintained where workpieces of varying sizes and strength characteristics are thereafter gripped by differing closing pressures.

A further object of the invention is to provide a chuck having radially adjustable jaws wherein the jaws are balanced against centrifugal separation, and such balance is mintained though the jaws may occupy different radial positions in successive gripping operations.

A further object is to provide a balanced chuck wherein the balancing medium is exposed at the surface of the chuck body and therefore highly accessible in the event that balance correction or adjustment is found necessary.

A further object is to provide in a rotary chuck having a plurality of radially operative jaws, means for separately balancing each jaw against centrifugal opening, whereby variations in inertia characteristics between simultaneously employed jaws may be compensated for.

The chuck illustrated, aside from the balancing features, is quite similar to that described in a patent by C. H. Johnson, Patent No. 2,422,785, and issued to the assignee of the present invention. Its several radial jaws are each controlled by a common axially disposed fluid-actuated draw rod acting through bell crank levers radially disposed within the chuck body adjacent each jaw base. Arms of each lever extend diametrically opposite from the lever pivot to engage and actuate a jaw base and radially movable balancing block, respectively. As the jaw base and balancing block are disposed on opposite sides of the lever pivot, their inertia forces during rotation of the chuck are opposed with relation to the lever pivot. The initial closed pivotal position of the bell crank lever may thus be unaffected by the rotation of the chuck.

Other objects and advantages of the invention will appear in the accompanying description of an embodiment thereof illustrated in the drawings.

Figure 6:
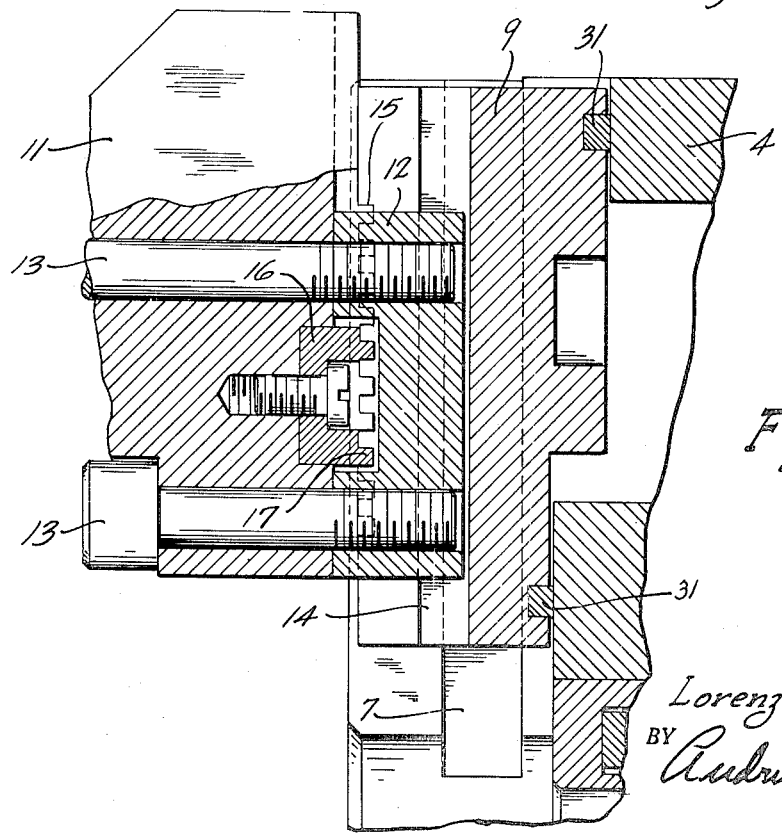

In the drawings:

Figure 1 is an end elevation of the chuck;
Fig. 2 is a side elevation of the chuck;
Fig. 3 is a vertical central section taken on line 3—3 of Fig. 1;
Fig. 4 is a section taken through the draw rod and associated members on line 4—4 of Fig. 1;
Fig. 5 is a detail transverse section taken through one of the jaws on line 5—5 of Fig. 3;
Fig. 6 is a detail vertical section showing the manner of attachment of the jaw to the slides;
Fig. 7 is a detail view showing the front of the slide with the jaw removed; and
Fig. 8 is a rear view of the chuck showing the balance blocks and weights.

Referring to the drawing, the chuck is shown secured to the forward flange of a hollow lathe spindle 1 by bolts 2 which pass through back plate 3 of the chuck to within its chuck body 4. Chuck body 4 is cylindrical and has a central opening 5 axially aligned with the bore of spindle 1. Bolts 6 join plate 3 and body 4 so that the chuck may be removed from spindle 1 as a unit.

The forward face of chuck body 4 is provided with T-shaped radial slots 7 and 8 in which jaw bases 9 are movably mounted. Each jaw base 9 is formed with tongues 10 which retain it within the corresponding slots 7 and 8.

Each jaw base 9 carries a jaw 11 protruding forwardly of chuck body 4. Jaws 11 and jaw bases 9 are joined by T-clamps 12 which are secured to the jaws by bolts 13 and ride within radial T-slots 14 formed in the forward face of each jaw base. To permit radial adjustment of jaws 11 and their T-clamps 12 within radial slots 14, each jaw base 9 has a portion of its surface to either side of slot 14 provided with a rack-like series of teeth 15. An insert 16 is secured within a recess in each jaw 11 and is provided with a series of gear-like teeth 17 which may be selectively disposed in racks 15 of base 9 at desired relative positions. Teeth 17 may be readily repositioned on racks 15 by loosening bolts 13, which permits some separation of jaw 9 and its T-clamp 12, thereby permitting radial movement of the jaw, T-clamp and their insert 16 relative to the jaw base. Bolts 13 are then retightened at the newly selected radial position of jaw 11 relative to its jaw base 9.

Jaw bases 9 and their rigidly supported jaws 11 have their radial movement controlled by bell crank levers 18 circumferentially spaced in chuck body 4, each lever being disposed behind a corresponding jaw base 9 in recesses formed in the chuck body. The levers 18 carry trunnion-like projections journaled for pivotal movement in chuck body 4.

Movement of each lever 18 is imparted to the corresponding jaw base 9 by a forwardly extending finger 19 of the lever which is disposed in a recess formed in the back of the jaw base.

Levers 18 are simultaneously pivoted by lengthwise movement of a fluid pressure operated draw rod 20 axially disposed within hollow spindle 1. Rod 20 acts through a coaxially aligned draw sleeve 21, a slider collar 22 threaded about sleeve 21, and arms 23 of each crank lever 18 having end knobs disposed in circumferential notches in the slider 22.

When draw rod 20 moves rearwardly the crank levers 18 are pivoted in a counterclockwise direction, as viewed in Fig. 3, thereby causing jaws 11 to converge inwardly. Forward movement of rod 20 effects separation of the jaws.

Slider collar 22 is mounted in a bushing 24 inside chuck body 4 and back plate 3. A slider-seal 25 is held against a shoulder 26 of body 4 by bushing 24 and has a portion 27 extending within the collar 22. The collar is thus protected against the leakage of oil which is introduced to within the chuck through oil nipple 28, oil passage 29, and oil grooves formed in the outer wall of bushing 24 (see Fig. 4). Additional oil nipples 30 may be provided to service the crank lever 18, as shown in Fig. 5. A passageway in chuck body 4 may be disposed to carry lubricant from nipples 30 to passages formed within the lever 18 and its several arms. Leakage of oil past the jaw bases 9 may be prevented by felt strips 31 disposed between the jaw base and chuck body 4.

As stated above, endwise movement of fluid actuated draw rod 20 results in either a jaw closing counterclockwise movement of crank lever 18 or a clockwise jaw opening pivotal rotation of the same. When a fragile workpiece is initially placed between the jaws 11, it is desirable to exert only enough pressure through the levers 18 to insure gripping of the work at the rotational speed of the jaws at the time of initial engagement of the work. At such time the jaws are normally stationary or rotating at a speed substantially below that attained during operation upon the workpiece. When rotary speed is subsequently increased, centrifugal force will tend to throw the jaws 11 and jaw bases 9 radially outwardly away from the work, thereby normally loosening the grip of jaws 11 as the crank lever 18 is caused to pivot in a clockwise direction against the theretofore adequate hydraulic closing pressure exerted through rod 20.

To avoid the need for applying initially excessive pressure upon lever 18, jaws 11 and the work to compensate for centrifugally induced loosening of the jaw grip, the present invention provides means for utilizing the centrifugal action of the chuck to exert counterclockwise pressure on levers 18 which opposes the clockwise centrifugally induced opening movement of the lever independent of the fluid operated draw rod 20. By employing centrifugal forces as the balancing agency, the compensating balancing pressure may be made to vary proportionately to the jaw-loosening force whereby speed of rotation is eliminated as an unbalancing factor.

The balancing means illustrated in the present application comprises balance blocks 32 disposed for radial movement in back plate 3, each block 32 being formed with a recess 33 in which is disposed a rearwardly extending arm 34 of the corresponding crank lever 18. Balance blocks 32 ride in radially extending grooves 35 formed in back plate 3 in much the same manner as the jaw bases 11 are carried by radial chuck body slots 7 and 8. The rear portion of each balance block 32 is exposed behind back plate 3 where a replaceable balance weight 36 is secured to the block by a screw 37.

Arms 34 and fingers 19 of the levers 18 coacting with the balance blocks 32 and jaw bases 9, respectively, are disposed substantially diametrically opposite the lever pivots so that forces exerted upon them radially of the chuck oppose each other in effecting any pivotal movement of the levers. Therefore, upon rotation of the chuck, the inertia forces of blocks 32 and jaw bases 9 and their associated elements are opposed in their effect upon rotation of the lever 18.

Knowing the length of arms 34 and fingers 19 and weights of the several elements supported by the same, it is possible to apply a balance weight 36 to block 32 which will cause their combined masses to have inertia characteristics equal to that of the jaws 11, jaw bases 9 and associated elements.

The hydraulic pressure exerted through draw rod 20 also may vary without effect upon the balancing action once an inertia equality is established about the pivot of crank lever 18.

When different jaws are substituted on jaw bases 9, replacement of balance weight 36 may be readily made to renew the inertia balance about the pivot of lever 18.

Relocation of the jaws 11 relative to their jaw bases 9 by adjustment of insert 16 along the jaw base racks 15 does not disturb the inertia balance, however. This is because the centrifugal forces of the jaws 11 and jaw bases 9 are always exerted radially along jaw base slots 7 and 8, and these forces are always applied to lever fingers 19 at a single point of contact. Fingers 19 are provided with knob-like ends to insure such point contact.

The balance arms 34 of levers 18 may be made somewhat longer than opposed fingers 19 so that balance blocks 32 and their weights 36 will act at a greater distance from the pivot of lever 18, and therefore may be of less combined weight than the members acting upon fingers 19. Weight is applied to arms 34 at a single point as in the case of fingers 19.

The chuck is simple in construction yet provides a highly effective means of compensating for centrifugal separation of the jaw members. Very accurate counterbalance of jaw inertia may be obtained. Once established, the balance is maintained though operating speed and jaw pressure vary from one operation to the next, and though the jaws may assume different radial positions in successive gripping operations. Renewal of balance, after the substitution of jaws of different weight, requires only the substitution of highly accessible balance weights exposed at the surface of the chuck.

Should the several simultaneously employed jaws 11 somewhat differ in weight, variations in centrifugal force thus exerted upon their respective levers 18 may be nullified by the application to blocks 32 of correspondingly differing balance weights 36.

Should it be desirable to increase the gripping pressures of the jaws upon the work at higher rotational speeds other than by applying increased fluid pressure through rod 20, weights 36 may be added sufficient to more than compensate for the centrifugal forces of the jaws whereby centrifugal forces of the weights may be transmitted to effect or assist tightening of the grip of the jaws upon the work.

Due to counter-balance of centrifugal jaw opening forces present during chuck rotation, substantially less closing force need be applied to the jaws at high rotational speeds. Thereby, the jaw closing mechanism, such as an air cylinder for operating draw rod 20, may be considerably lighter and less expensive. This is of special importance, as the air cylinder or other actuating means is ordinarily mounted to rotate with the chuck during its operation. It has been found that in most instances chucks having the balancing features of this invention may be adequately actuated by an air piston of only one-third the cross-sectional area of similarly employed chucks lacking counter-balance of centrifugal opening forces.

Various embodiments of the invention may be employed within the scope of the following claims.

I claim:

1. A rotary chuck comprising gripping means disposed for radial operating movement to grip an object by radial inward movement thereof whereby high rotational speeds tend to release the object by reason of centrifugal forces acting upon the gripping means, bell crank lever means having a short arm engaging said gripping means to actuate the same, axially movable draw means connected to actuate said bell crank lever means, balancing means supported for free radial movement adjacent said bell crank lever means opposite said gripping means, and a lever carried by said bell crank lever opposite to said short arm thereof and engaging said balancing means to be actuated thereby, said balancing means being adapted to press radially outwardly on said last-named lever to oppose outward centrifugal displacement of said gripping means during rotation of the chuck and leave said draw means effective for gripping action.

2. A rotary chuck comprising gripping means having jaws disposed for radial operating movement to grip an object by radial inward movement thereof whereby high rotational speeds tend to release the object by reason of centrifugal forces acting upon the gripping means, bell crank lever means having a short arm engaging said gripping means to actuate the same, axially movable draw means connected to actuate said bell crank lever means, balancing means supported for free radial movement adjacent said bell crank lever means opposite said gripping means, a lever carried by said bell crank lever opposite to said short arm thereof and engaging said balancing means to be actuated thereby, said balancing means being adapted to press radially outwardly on said last named lever to oppose outward centrifugal displacement of said gripping means during rotation of the chuck and leave said draw means effective for gripping action, and means for varying the force exerted on said lever by said balancing means to compensate for any variation in jaw displacing inertia forces.

3. A rotary chuck comprising a chuck body, jaws mounted on the face of said chuck for cooperative radial movement and disposed to grip an object by radial inward movement of the jaws whereby high rotating speeds tend to release the object by reason of centrifugal forces acting upon the jaws, a balancing member supported for free radial movement in said chuck body and disposed behind each of said jaws, a lever pivotally supported in the chuck body between each of said jaws and the corresponding balancing member and connected to pivot in response to opposed radial movement of the same, and power means to actuate said levers to effect gripping of an object under substantially predetermined gripping forces, said balancing members being adapted to press outwardly on said levers to oppose centrifugal separation of said jaws during rotation of the chuck and thereby restrict the gripping forces substantially to within the range of forces determined by said power means.

4. A rotary chuck comprising a chuck body, a jaw mounted on the face of said chuck for radial gripping movement and disposed to engage an object by radial inward movement of the jaw whereby high rotating speeds tend to release the object by reason of centrifugal forces acting upon the jaw, a balancing member supported for free radial movement in said chuck body and disposed behind said jaw, a lever pivotally supported in the chuck body between said jaw and balancing member and connected to pivot in response to opposed radial movement of the same, and power means to actuate said lever to effect gripping of an object by said jaw, said balancing member being adapted to press outwardly on said lever to oppose outward centrifugal displacement of said jaw during rotation of the chuck and thereby restrict the gripping forces substantially to within the range of forces determined by said power means.

5. A rotary chuck comprising a chuck body, a jaw replaceably mounted on the face of said chuck body for radial gripping movement and disposed to engage an object by radial inward movement of the jaw whereby high rotating speeds tend to release the object by reason of centrifugal forces acting upon the jaw, a balancing member supported for free radial movement in said chuck body and disposed behind said jaw, a lever pivotally supported in the chuck body between said jaw and balancing member and connected to pivot in response to opposed radial movement of the same, power means to actuate said lever to effect gripping of an object by said jaw, said balancing member being adapted to press outwardly on said lever to oppose outward centrifugal displacement of said jaw during rotation of the chuck and to thereby maintain the gripping forces effected by said power means, and means for varying the weight exerted by said balancing member on said lever to compensate for any variations in jaw displacing inertia forces.

6. A rotary chuck comprising a chuck body, jaws replaceably mounted on the face of said chuck body for cooperative radial movement and disposed to grip an object by radial inward movement of the jaws whereby high rotating speeds tend to release the object by reason of centrifugal forces acting upon the jaws, a balancing member supported for free radial movement in said chuck body and disposed behind each of said jaws, a lever pivotally supported in the chuck body between each of said jaws and the corresponding balancing member and connected to pivot in response to opposed radial movement of the same, power means to actuate said lever to effect gripping of an object by said jaw, said balancing member being adapted to press outwardly on said levers to oppose centrifugal separation of said jaws during rotation of the chuck and to thereby maintain the gripping forces effected by said power means, and means for varying the weight exerted by said balancing member on said lever to compensate for any variations in jaw displacing inertia forces.

7. A rotary chuck comprising a chuck body, jaws replaceably mounted on the face of said chuck body for cooperative radial movement and disposed to grip an object by radial inward movement of the jaws whereby high rotating speeds tend to release the object by reason of centrifugal forces acting upon the jaws, a balancing member supported for free radial movement in said chuck body and disposed behind each of said jaws, a lever pivotally supported in the chuck body between each of said jaws and the corresponding balancing member and connected to pivot in response to opposed radial movement of the same, said balancing member being adapted to press outwardly on said levers to oppose centrifugal separation of said jaws during rotation of the chuck, and a balance weight detachably carried by each said balancing member to cause the weight exerted through the balancing members to fully counteract centrifugal separation of the corresponding jaws employed.

8. A rotary chuck comprising a chuck body having an axial opening therein, jaws mounted on the face of said chuck body for cooperative radial movement and disposed to grip an object by radial inward movement of the jaws whereby high rotating speeds tend to release the object by reason of centrifugal forces acting upon the jaws, a balancing member supported for free radial movement in said chuck body and disposed behind each of said jaws, an actuating member axially movable in the opening of the chuck body, a lever member pivotally supported in the chuck body between each pair of said jaws and balancing members and having an arm conencted with said actuating member, arms carried by each said lever member on opposite sides of said first mentioned arm and connected respectively with a jaw and balancing member to effect opposed radial movement of the same upon pivotal movement of said lever by said actuating member, said balancing members being adapted to press outwardly on said levers to oppose centrifugal separation of said jaws during rotation of the chuck and maintain a predetermined pivotal position of said lever determined by said actuating member.

9. A rotary chuck comprising a chuck body, jaws mounted on the face of said chuck body for cooperative radial movement and disposed to grip an object by radial inward movement of the jaws whereby high rotating speeds tend to release the object by reason of centrifugal forces acting upon the jaws, a balancing member supported for free radial movement in said chuck body and disposed behind each of said jaws, a lever pivotally supported in the chuck body between each of said jaws and the corresponding balancing member and connected to pivot in response to opposed radial movement of the same, power means to actuate said lever to effect gripping of an object by said jaw, said balancing members and jaws being disposed to press outwardly on their respective levers due to centrifugal action during rotation of the chuck and to thereby maintain the gripping forces effected by said power means, and said balancing members being of a weight sufficient to exert greater outward forces on the levers than exerted by said jaws during rotation to effect tightening of the jaws upon a workpiece at high rotational speeds.

10. A rotary chuck comprising a chuck body, jaws mounted on the face of said chuck body for cooperative radial movement and disposed to grip an object by radial inward movement of the jaws whereby high rotating speeds tend to release the object by reason of centrifugal forces acting upon the jaws, a balancing member supported for free radial movement in said chuck body and disposed behind each of said jaws, a lever pivotally supported in the chuck body between each of said jaws and the corresponding balancing member and connected to pivot in response to opposed radial movement of the same, power means to actuate said lever to effect gripping of an object by said jaw, said balancing members and jaws being disposed to press outwardly on their respective levers due to centrifugal action during rotation of the chuck and to thereby maintain the gripping forces effected by said power means, and a replaceable balance weight carried by each said balancing member to cause the outward forces exerted through the balancing members on said levers to exceed that exerted by said jaws during rotation to effect tightening of the jaws upon a workpiece at high rotational speeds.

11. In combination in a lever actuated jaw chuck adapted for high speed rotation tending to separate the jaws by centrifugal force, a rotary chuck body, a plurality of radially movable circumferentially spaced jaws carried by said body and disposed to grip an object by radial inward movement of the jaws, a lever pivotally carried by said body and disposed to actuate each corresponding jaw, a common actuating means for said levers, and a centrifugally actuated weight carried by said body and connected to each said lever on the opposite side from the corresponding jaw to counterbalance at least in part the centrifugal force acting upon the jaws.

12. In combination in a lever actuated jaw chuck adapted for high speed rotation tending to separate the jaws by centrifugal force, power means to actuate the jaws to effect gripping of a workpiece within a predetermined range of gripping forces, and means to compensate for centrifugal action of the jaws to maintain the gripping forces effected by said power means.

References Cited in the file of this patent

UNITED STATES PATENTS

| | | |
|---|---|---|
| 1,906,410 | Potgieter | May 2, 1933 |
| 1,990,525 | Chancellor | Feb. 12, 1935 |
| 2,225,377 | Mussari | Dec. 17, 1940 |
| 2,422,785 | Johnson | June 24, 1947 |
| 2,479,973 | Scott et al. | Aug. 23, 1949 |
| 2,518,934 | Renner et al. | Aug. 15, 1950 |

FOREIGN PATENTS

| | | |
|---|---|---|
| 364,463 | France | Aug. 23, 1906 |
| 481,505 | France | Sept. 19, 1916 |